T. W. BARBER.
PROCESS FOR PURIFYING LIQUIDS.
APPLICATION FILED MAY 11, 1916.
1,194,933.
Patented Aug. 15, 1916.
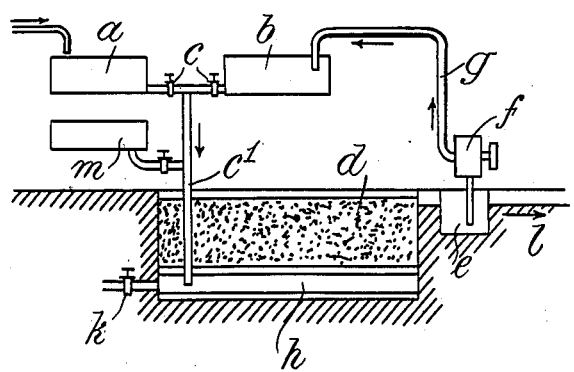

UNITED STATES PATENT OFFICE.

THOMAS WALTER BARBER, OF WESTMINSTER, LONDON, ENGLAND.

PROCESS FOR PURIFYING LIQUIDS.

1,194,933. Specification of Letters Patent. Patented Aug. 15, 1916.

Application filed May 11, 1916. Serial No. 96,901.

*To all whom it may concern:*

Be it known that I, THOMAS WALTER BARBER, a subject of His Majesty the King of England, and resident of Westminster, in the county of London, Kingdom of England, have invented a certain new and useful Improved Process for Purifying Liquids, of which the following is a specification.

This invention relates to an improved process of purifying liquids and it refers more particularly to trade waste liquors, sewages, and the like.

It is well known that certain of such trade waste liquors, sewages, and the like, are so acid or alkaline in reaction or contain so much poisonous matter, that their purification by biological processes is impossible. In their treatment hitherto dilution has been practised. Unless however, a very large quantity of diluting liquor is available, this method is not a success, and if fresh water has to be used, it would be impracticable while chemical processes too often introduce as many objectionable features as they remove.

According to the present invention the improved process consists in diluting the liquor to be treated to the extent necessary to enable its purification by means of biological agencies, and then using the purified effluent as a diluent to the fresh untreated liquor. In this way, with the exception of the quantity of liquid required to provide the necessary dilution in the first instance, no external supply is called for, the process being in the nature of a closed cycle of operations, in which there is received a quantity of untreated liquor at one point in the cycle, and in which there is discharged an equivalent quantity of treated effluent at another. In practice, therefore, the plant has to be of a capacity sufficient to deal with the quantity of untreated liquor, multiplied by the necessary number of dilutions. Thus, to treat 1000 gallons per hour of a liquor, requiring a dilution of 10 to 1, the plant must have a capacity of 10000 gallons per hour.

The process may be carried out in conjunction with tanks, filters or contact beds, of any convenient type, or a combination of these, and the filters or beds should be brought into a suitable condition of biological activity, previous to commencing the treatment of the liquor.

The liquor to be purified is diluted to the required extent and there is introduced a small quantity of organic matter such as soil, humus, sludge or the like, carrying the desired bacteria and to provide necessary food for their development. Such food will, in many cases, be absent from the liquor itself. Precipitants, absorbents or neutralizing agents or more than one of these may be also utilized according to the characteristics of the liquor.

Provision should be made for the periodic removal of the solid matters which will accumulate in the tanks, filters or beds, and these will consist, not only of the waste products of biological processes, but also of poisonous and other matters absorbed or deposited from the purified liquid, and which, if allowed to collect and remain too long, would inhibit bacterial life.

In some cases, the matters inimical to biological development may not be entirely removed from the liquor by this process and in such cases it will be necessary, periodically, either to replace the whole or a portion of the effluent in the cycle; or to treat the whole, or a portion, in any desired appropriate manner with a view to the removal of such matters.

A description of this process in practice, in connection with the purification of the waste liquid from a coke plant, is given as an example:—This waste liquid contains phenols and cyanids and obstinately resists treatment by any known practical processes. According to this improved process, it is diluted with from 10 to 20 times its own volume of water and from 1% to 5% of sludge, from an ordinary sewage purification plant, and $\frac{1}{2}$% to 1% of fine clay in suspension, well mixed together, and then passed into a contact bed or filter, preferably of the upward flow type, and provided with efficient means for the flushing away of the solid matters which accumulate during working. The beds or filters must have been brought into a suitable condition of activity previously. This can be conveniently effected by "seeding" them, or preferably, by serving them with domestic sewage or the like for a period of from 4 to 6 weeks. The beds or filters may be operated in series, or by any of the usual recognized methods. The flushing out of the beds or filters takes place daily, and the liquid drawn off is settled, when the solid portions are removed and the liquid portion returned for refiltration. One portion of the effluent from the filter is allowed to flow away. An amount the equivalent to that of the incoming untreated liquor is passed, and the other part, an amount equivalent to that of the diluent is passed back to the entrance end of the system, to be added to the fresh incoming untreated liquor.

The process may be continuous or intermittent. If intermittent, storage provision must be made for the diluent (effluent) during the period of rest.

Suitable apparatus for carrying the process into effect is diagrammatically illustrated in the annexed drawing, in which:—

The tank for containing the liquor to be treated is indicated by the reference letter $a$; the tank for the effluent return (from $e$) by the letter $b$ and the control cocks for mixing the contents of the two tanks in correct proportion by the letter $c$. An upward flow contact bed is indicated at $d$ and this is provided for the purification of the mixed liquor which is delivered thereto by means of the pipe $c'$ together with a controlled solution of organic matter and clay or precipitant from the tank $m$. The letter $e$ indicates a receptacle for the purified effluent; $f$ a pump to raise the said effluent to the aforesaid tank $b$ by way of the pipe $g$; $h$ a space for the deposited solids; $k$ cleansing cock for said deposited solids; and $l$ a discharge for the purified effluent.

What I claim is:—

1. A process for purifying waste liquors, sewages, and the like, consisting of diluting the liquor to the extent necessary to render the same suitable for purification by means of biological agencies, adding organic matter capable of serving as bacteria carriers and nutrients to the said diluted liquor, discharging from the system an amount of purified effluent substantially equivalent to the incoming foul liquor, and returning the remainder of said purified liquor to the system for diluting the incoming foul liquor, substantially as described.

2. A process of septically treating any waste liquid which contains such large amounts of ingredients injurious to the growth and development of bacteria as to render the same not readily amenable to septic treatment directly which comprises providing a volume of a diluent liquid relatively free from such injurious ingredients, adding thereto only so large a quantity of such waste liquid as is incapable of preventing bacterial growth and development, subjecting such mixed liquid to bacterial action until the desired septic treatment has been effected, thereafter adding to a portion thereof a further quantity of said waste liquid to be treated, and repeating the cycle of operations.

3. A process of septically treating any waste liquid which contains such large amounts of ingredients injurious to the growth and development of bacteria as to render the same not readily amenable to septic treatment directly, which comprises providing a volume of a diluent liquid relatively free from such injurious ingredients, adding thereto only so large a quantity of such waste liquid as is incapable of preventing bacterial growth and development, subjecting such mixed liquid to bacterial action until the desired septic treatment has been effected, thereafter adding to a portion thereof a further quantity of said waste liquid to be treated, subjecting at least a portion of the liquid to be returned at any desired stage of the treatment to a chemical treatment capable of reducing the quantity of such materials therein as are capable of injuriously affecting bacterial growth, and repeating the cycle of operations.

4. A process of septically treating any waste liquid which contains such large amounts of ingredients injurious to the growth and development of bacteria as to render the same not readily amenable to septic treatment directly which comprises providing a volume of a diluent liquid relatively free from such injurious ingredients, adding thereto only so large a quantity of such waste liquid as is incapable of preventing bacterial growth and development, subjecting such mixed liquid to bacterial action until the desired septic treatment has been effected, filtering the circulating liquid at any desired stage of the treatment to separate solid insoluble materials therefrom, thereafter adding to a portion thereof a further quantity of said waste liquid to be treated, and repeating the cycle of operations.

5. A process of septically treating any waste liquid which contains such large amounts of ingredients injurious to the growth and development of bacteria as to render the same not readily amenable to septic treatment directly, which comprises providing a volume of a diluent liquid relatively free from such injurious ingredients, adding thereto only so large a quantity of such waste liquid as is incapable of preventing bacterial growth and development, adding bacteria and nutrient material therefor in amount sufficient to make up for any deficiency thereof, subjecting such mixed liquid to bacterial action until the desired septic treatment has been effected, thereafter adding to a portion thereof a further quantity of said waste liquid to be treated, and repeating the cycle of operations.

In testimony whereof I have hereunto signed my name to this specification.

THOMAS WALTER BARBER.